July 16, 1968 | S. M. SHELLEY | 3,393,392

PRINTED CIRCUIT CONNECTOR

Filed April 27, 1966

INVENTOR.
STEVEN M. SHELLEY
BY Edward J. Norton
Attorney

United States Patent Office 3,393,392
Patented July 16, 1968

3,393,392

PRINTED CIRCUIT CONNECTOR

Steven M. Shelley, Haddonfield, N.J., assignor to Radio Corporation of America, a corporation of Delaware
Filed Apr. 27, 1966, Ser. No. 545,725
1 Claim. (Cl. 339—17)

ABSTRACT OF THE DISCLOSURE

A connector element for terminating flat, flexible types of cable adapted for insertion into an edge receptacle. The end of the cable is sandwiched between two rigid printed circuit boards and desired connections provided therebetween via solder filled through holes formed within the boards.

This invention relates to connectors and more particularly to an improved connector of the type used with cables or transmission lines.

One of the major drawbacks of presently known connectors used with flat cables is that a cable affixed thereto often becomes separated from the connector because of careless or rough use. To overcome this difficulty, some connectors are furnished with brackets or other reinforcing means. These brackets add to the cost of the connectors and provide additional steps in the joining of connector units. Where miniaturized circuits are to be joined by means of a connector assembly, strain relief brackets often prove too large and cumbersome to be practical.

A further drawback is that flat cables typically have a plurality of conductors in a fixed pattern which cannot be easily altered. Previously known connectors require special equipment or time consuming modifications to handle a conductor in a flat cable which is out of alignment with a desired connector contact.

It is the general object of this invention to provide an improved, efficient, low cost connector.

A further object is to provide an improved connector for flat cables which may be readily assembled and manufactured with known methods and known machinery and which has fewer parts than have heretofore been necessary.

Briefly, in accordance with one embodiment of this invention, the end of a cable, having one or more conductors, is sandwiched between two boards of insulating material. A suitable bonding agent is used to hold the cable firmly between the boards. Electrical connections can be completed between a printed circuit on the outer surface of one or both of the boards and the conductors of the cable through plated holes in the boards. A connector of durable and reliable construction is provided, as well as one facilitating connections to the cable conducting paths.

This invention will best be understood from the following detailed description when read in connection with the accompanying drawing in which the same reference characters are repeated in each figure to identify the same part.

Figure 1:
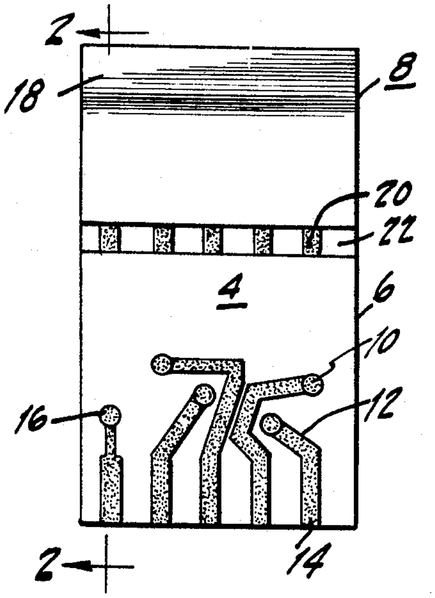
FIG. 1 is a front view, partially sectioned, of an electrical assembly embodying one form of a connector constructed in accordance with the invention.
Figure 2:
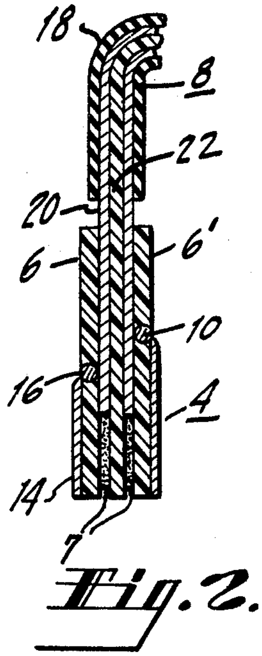
FIG. 2 is a sectional view taken along the line 2—2 of FIG. 1 and looking in the direction of the arrows.

The assembly 4 shown in FIGS. 1 and 2 is so constructed as to fit into the receptacle portion of a conventional printed circuit connector (not shown). The connector is, in combination, a pair of printed circuit boards 6 and 6′ placed on either side of a flat cable 8 and joined thereto by means of bonding.

The printed circuit boards 6 and 6′ have thereon circuit patterns 12 which terminate in a series of contact elements 14. The contact elements 14 are similar in size and dimension to those commonly used in printed circuit board connectors. The printed circuit pattern 12 can be made in a manner commonly known, such as etching circuitry out of the copper covering of a phenolic board. Each of the boards 6 and 6′ have holes 16 whose surfaces have been covered by an electrically conductive substance, such as electroless and copper. These holes 16 can be, for example, of the plated through type. The printed circuit patterns 12 are electrically joined to these holes 16. A quantity of solder 10 is placed in each of the holes 16.

The flat conductor cable 8 has part of its insulation 18 stripped from one end. Cables 8 of this type are commonly formed of either a plurality of separately insulated wires or, as shown in FIGS. 1 and 2, of conductive paths 20 of copper on either side of a flexible substrate 22.

The printed circuit boards 6 (which can be rectangular in shape and made of glass epoxy) are placed on either side of the flat cable 8. The holes 16 are placed in the respective boards 6, 6′ to register with the exposed conducting paths 20 as desired. The boards 6 and 6′ are aligned with one another to provide even edges for the connector. The assembly is heated under pressure, causing the solder 10 in the holes 16 to flow, thus making electrical as well as mechanical connection between the boards 6 and the cable 8 and forming a tight connector assembly 4.

The undersurface of each board 6, 6′ is coated with an adhesive 7, which can be a polyester Mylar type, which acts to bond the printed circuit boards 6, 6′ to the cable 8.

The combined circuit boards 6 and 6′ and cable 8 form a connector 4 of sufficient dimension to fit within a typical printed circuit board receptacle (not shown). The connector 4 forms a tight fit to a cable without additional fastening means. In addition, a conductive path 20 of the cable 8 can be joined to a nonaligned contact element 14, for example. Connection is made by connecting a conductive hole 16 to the fixed conductive path 20 and printing a circuit path 12 from that hole 16 to a desired contact element 14.

What is claimed is:

1. A connector for use with a flat cable including a flexible substrate at least on one side of which are positioned a plurality of parallel conductive paths, said connector adapted for insertion into an edge type receptacle, and being characterized by first and second rigid circuit boards disposed in cooperative relationship to sandwich therebetween one end of said cable, said boards having printed circuitry formed on the exterior surfaces of said sandwiched assembly, and having a layer of adhesive material on the interior surfaces of said assembly, said printed circuitry terminating at the edge of the boards to be inserted into said edge type receptacle, said boards being further formed with holes of the through type, each of said holes serving as a conduit between the printed circuitry on said circuit boards and the conductive paths of said cable sandwiched therebetween, each of said through holes being provided with a quantity of solder, whereby, upon subjection to heat and pressure, an electrical connection is provided between the printed circuitry upon said boards and the conductive paths of said cable via said solder filled through holes, and a mechanical connection provided via said solder and said adhesive layers.

References Cited

UNITED STATES PATENTS

| | | | |
|---|---|---|---|
| 2,864,156 | 12/1958 | Cardy. | |
| 2,885,509 | 5/1959 | Diesel | 339—17 |
| 3,070,650 | 12/1962 | Stearns. | |
| 3,077,511 | 2/1963 | Bohrer et al. | |
| 3,168,617 | 2/1965 | Richter | 174—117 |
| 3,189,864 | 6/1965 | Angele et al. | |
| 3,193,789 | 7/1965 | Brown. | |
| 3,202,869 | 8/1965 | Matson et al. | 317—100 |

PATRICK A. CLIFFORD, *Examiner.*

MARVIN A. CHAMPION, *Primary Examiner.*